C. H. HIPP.
PERMUTATION LOCK.
APPLICATION FILED DEC. 2, 1916.
1,237,906.
Patented Aug. 21, 1917.
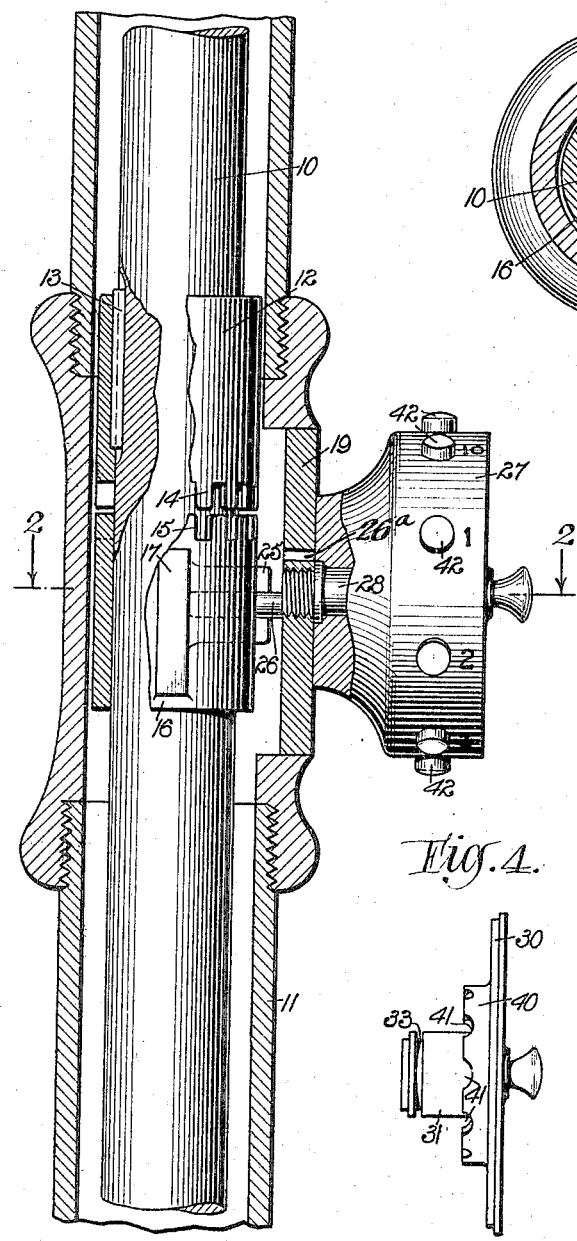
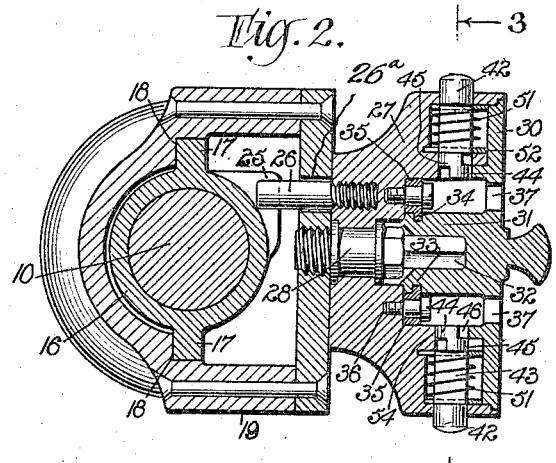
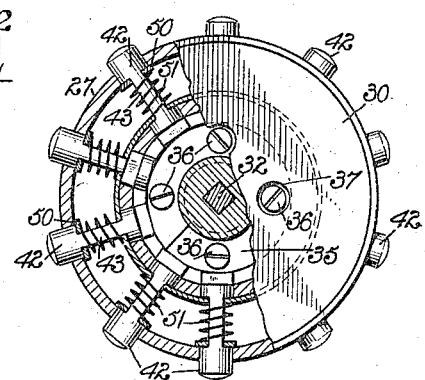
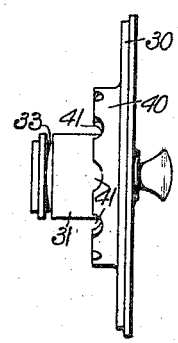
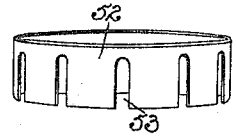
WITNESSES
Frederick Diehl.
Rev. G. Wooster.
INVENTOR
Charles H. Hipp
BY
ATTORNEYS

UNITED STATES PATENT OFFICE.

CHARLES HENRY HIPP, OF FORT TERRY, NEW YORK.

PERMUTATION-LOCK.

1,237,906.  Specification of Letters Patent.  Patented Aug. 21, 1917.

Application filed December 2, 1916. Serial No. 134,609.

*To all whom it may concern:*

Be it known that I, CHARLES H. HIPP, a citizen of the United States, and a resident of Fort Terry, in the county of Suffolk and State of New York, have invented a new and Improved Permutation-Lock, of which the following is a full, clear, and exact description.

The object of the invention is to provide a new and improved permutation lock more especially designed for locking the steering shaft of an automobile, motor cycle, bicycle or like machine against turning by unauthorized persons. Another object is to provide such a lock which will be difficult to pick or to be successfully manipulated by an unauthorized person.

In order to accomplish the desired result, use is made of a fixed member, a knob mounted concentrically relative to the said fixed member and adapted to be rotated by the operator when unlocked, and spring-pressed locking pins mounted on the said knob and in engagement with the said fixed member, the said locking pins and the said fixed member having coacting means and sundry of the said locking pins being in locking engagement with the said fixed member and when pressed moving out of locking position, and the remaining locking pins being in unlocked position relative to the said fixed member and when pressed moving into locking position relative to the fixed member.

A practical embodiment of the invention is represented in the accompanying drawings forming a part of this specification, in which similar characters of reference indicate corresponding parts in all the views.

Figure 1 is a sectional side elevation of the locking device as applied to the steering shaft of an automobile, parts being shown in elevation;

Fig. 2 is a sectional plan view of the same on the line 2—2 of Fig. 1;

Fig. 3 is a cross section of the same on the line 3—3 of Fig. 2 and with parts shown in elevation;

Fig. 4 is an edge view of the fixed member forming the cover for the knob;

Fig. 5 is a perspective view of the guide ring for the pins;

Fig. 6 is a similar view of one of the washers for the pins; and

Fig. 7 is a perspective view of one of the pins.

The lock is shown applied to the steering shaft 10 of an automobile, motor cycle or other machine, the said steering shaft extending through the usual steering post or housing 11. On the steering shaft 10 is secured a locking member 12 in the form of a sleeve fastened in place by a key 13 or other fastening means, and the lower end of the locking member 12 is provided with teeth 14 adapted to be engaged by corresponding teeth 15 formed in a movable locking member 16 likewise in the shape of a sleeve mounted to slide up and down on the steering shaft 10. The movable member 16 is provided with guide ribs 17 engaging guideways 18 formed in a casing 19 attached to or forming part of the housing 11. By the arrangement described the locking member 16 is guided in its up and down movement without danger of turning.

The movable locking member 16 is provided at one side with spaced lugs 25 between which extends a pin 26 working in a curved slot 26ª in the casing 19 and held eccentrically on the inner end of a knob 27 mounted to turn on a stud 28 screwed or otherwise fastened to the casing 19. On turning the knob 27 the pin 26 imparts an up or down sliding movement to the movable locking member 16 according to the direction in which the knob 27 is turned at the time. When the locking sleeve 16 is moved upward then its teeth 15 move into engagement with the teeth 14 of the fixed locking member 12 so that the locking member and consequently the steering shaft 10 is held locked against turning. When the movable locking member 16 is moved downward its teeth 15 swing out of engagement with the teeth 14 thus unlocking the member 12 and the steering shaft 10 to permit turning of the same in the usual manner for steering purposes.

The knob 27 is made hollow and into its outer end fits loosely a locking member in the form of a disk 30 provided with a hub 31 engaging the polygonal end 32 of the stud 28 to hold the disk 30 against turning. The hub 31 is provided with an annular groove 33 into which fits the inner edge 34 of a sectional ring 35 fastened by screws 36 to the knob 27 to hold the fixed disk 30 against outward movement and to allow the knob 27 to rotate on the stud 28. Access to the screws 36 can be had by way of apertures 37 formed in the disk 30 to allow of inserting a screw driver or a similar tool for unscrewing the screws 36 whenever the disk 30 is in unlocked position and it is desired to remove the disk 30 from the polygonal end 32 of the stud 28.

The inner face of the disk 30 is provided with an annular flange 40 having semicircular notches 41 formed at its edge and spaced equal distances apart. The notches 41 are adapted to be engaged by the inner ends of locking pins 42 mounted to slide radially in the knob 27 and the outer ends of the said pins 42 project beyond the peripheral face of the knob 27 to permit the user to press the pins for the purpose hereinafter more fully explained. Each of the pins 42 is provided with a flat portion or a shank 43 and the inner end of each pin is provided with two bits 44 and 45 made semicylindrical and disposed diametrically opposite each other, one in front of the other thus forming notches 46 and 47 likewise diametrically opposite each other, as plainly indicated in Figs. 2 and 7.

The flat shank 43 of each pin 42 is engaged at its outer end by a washer 50 seated on the inner face of the rim of the knob 27, and on the said washer 50 rests the outer end of a spring 51 coiled on the shank 43 and resting with its inner end on a ring 52 provided with notches 53 straddling the inner ends of the shanks 43 of the several pins 42. By the use of the springs 51 the pins 42 are normally held in outermost position. The inner ends of the pins 42 are mounted to slide in a bearing 54 formed in the knob 27, and the arrangement is such that the innermost bit 44 is of a width corresponding to the width of the flange 40 and the bit is adapted to fit into a corresponding notch 41 at the time a pin 42 is in the position as shown in the upper portion of Fig. 2, that is, with the bit 44 outward and the bit 45 inward. A pin 42 in this position locks the knob 27 against rotation on the disk 30. The user of the lock, however, can set any one of the pins in a reverse direction so that the bit 44 is inward and the bit 45 outward as indicated in the lower portion of Fig. 2. In this case the notch 46 is in register with the corresponding notch 41 of the flange 40 and the pin 42 is now in locking position relative to the disk 30, but when this pin is pressed inward then the bit 45 moves into register with the corresponding notch 41 thus locking the knob 27 against turning on the disk 30. The peripheral face of the knob 27 is provided with consecutive numerals arranged alongside the corresponding pins 42, as shown in Fig. 1. By the use of the numerals the pins are quickly identified by the user of the locking device, and the user can readily set the pins into any one of the two positions mentioned and shown in the upper and lower portions of Fig. 2 so that any desired combination can be made, it being, however, understood that, at least, one of the pins 42 is in the position shown in the upper portion of Fig. 2, but, as a rule, three of the pins are set to this position while the remaining pins are set to the position shown in the lower portion of Fig. 2.

It will be noticed that normally the knob 27 is held against turning on the disk 30. When it is desired to lock the steering shaft 10 against turning, it is necessary for the operator to press the pins which are set in the locking position shown in the upper portion of Fig. 2 so that the bits 44 move out of engagement with the corresponding notches 41 and the recesses 47 move in register with the flange 40 thus permitting the knob 27 to be turned. When the knob is turned with the locking pin 42 in pressed position, the locking member 16 is engaged with the sleeve 12 and when this position has been reached the operator releases the pressed pins so that the latter return to locked position relative to the corresponding notches 41. It is understood that the turning movement of the knob 27 corresponds to the distance between adjacent notches 41 so that the pins 42 have their inner ends in register with the notches 41 after the knob has been turned to engage the locking member 16 with the locking member 12. As soon as the pressed pins 42 are released their springs 51 return the same to outermost position and in doing so the bits 44 move back into reëngagement with the corresponding notches 41 thus locking the knob 27 against turning on the disk 30. In will be noticed that if an unauthorized person should attempt to unlock the steering shaft 10 and presses some of the pins, say any one that is in the position shown in the lower portion of Fig. 2, then the corresponding bit 45 moves into engagement with the corresponding notch 41 thus providing another locking means for holding the knob 27 against turning. From the foregoing it will be seen that the unauthorized person could only rotate the knob 27 when the pins which are in the locking position shown in the upper portion of Fig. 2 are simultaneously pressed. From the foregoing it will also be seen that the pin that is in locked position when pressed moves into unlocking position, but the pin that is in unlocked position when pressed moves into locking position.

The user of the lock can readily change the position of the pins 42 to suit his own convenience, and in order to do so it is only necessary for the operator to first remove the screws 36 to allow the removal of the disk 30 thus gaining access to the guide ring 52 and the washers 50 which are next removed to allow removal of the pins for setting the same into the desired position, that is, with the bits 44 either in unlocking engagement relative to the flange 40 as shown in the upper portion of Fig. 2 or into locking position as shown in the lower portion of Fig. 2. When this has been done the several parts are re-assembled and the screws 36 are screwed up to fasten the re-assembled parts in position.

Having thus described my invention, I claim as new and desire to secure by Letters Patent:—

1. A permutation lock, comprising a stud, a knob mounted to turn on the stud, a fixed locking disk around which turns the said knob, and spring-pressed locking pins mounted to slide radially in the said knob and having their outer ends projecting outwardly from the peripheral face of the knob, the inner ends of the said locking pins having two diametrically opposite locking bits, one in front of the other, and the said fixed locking disk having integral means adapted to be engaged by the locking bit in active position at the time.

2. A permutation lock, comprising a stud, a knob mounted to turn on the stud, a fixed locking disk around which turns the said knob, spring-pressed locking pins mounted to slide radially in the said knob and having their outer ends projecting outwardly from the peripheral face of the knob, the inner ends of the said locking pins having two diametrically opposite locking bits one in front of the other and the said fixed locking disk having integral means adapted to be engaged by the locking bit in active position at the time, and means mounted in the knob and engaging the said pins to hold the latter against turning.

3. A permutation lock, comprising a stud, a knob mounted to turn on the stud, a locking disk held removable on the said stud and extending within the said knob, the said disk having a circular flange and provided with notches, and spring-pressed pins slidable radially in the said knob and having their inner ends provided with bits adapted to engage the said notches to lock the knob against turning, the pins having flat portions and a notched member in the knob and engaging the flat portions to hold the pins against turning.

4. A permutation lock, comprising a stud, a knob mounted to turn on the stud, a locking disk held removable on the said stud and extending within the said knob, the said disk having a circular flange provided with notches, spring-pressed pins slidable radially in the said knob and having their inner ends provided with two bits one in front of the other and located diametrically opposite each other, one of the bits of a pin being in operative position at a time relative to a corresponding notch in the said disk flange, sundry of the pins having their outermost bits normally in engagement with the corresponding notches and when pressed moving out of engagement, the remaining pins having their outer bits normally out of engagement with the corresponding notches and on being pressed having their rear bits moving into engagement with the corresponding notches, and means for preventing the pins from turning.

5. In a permutation lock, a hollow knob mounted to turn, a fixed disk extending in the said hollow knob and having a circular flange provided with notches, spring-pressed pins mounted to slide radially in the said knob, the inner end of each pin being provided with two bits arranged diametrically opposite each other and one in front of the other, the said bits being adapted to fit the said notches, and means to hold the pins against turning.

6. In a permutation lock, a locking pin having a flat shank and provided at its inner end with two semi-cylindrical bits arranged on opposite sides adjoining each other and extending in the direction of length of the pin, one of the said bits forming the terminal of said pin.

CHARLES HENRY HIPP.

Copies of this patent may be obtained for five cents each, by addressing the "Commissioner of Patents, Washington, D. C."